Aug. 8, 1967  E. ZILLMER  3,334,544

SLIDE PROJECTOR WITH SLIDE ACTUATED SHUTTER

Filed June 9, 1965

United States Patent Office 3,334,544
Patented Aug. 8, 1967

3,334,544
SLIDE PROJECTOR WITH SLIDE ACTUATED SHUTTER
Erich Zillmer, Braunschweig, Germany, assignor to Voigtlander A.G., Braunschweig, Germany, a corporation of Germany
Filed June 9, 1965, Ser. No. 462,534
Claims priority, application Germany, Sept. 5, 1964,
V 26,723
8 Claims. (Cl. 88—28)

ABSTRACT OF THE DISCLOSURE

A slide projector having a slide-shifting structure for shifting a slide to and from a projecting position where a light beam passes through the slide. A light-blocking means is supported for movement between a non-blocking position where the light-blocking means does not block the light beam and a blocking position where the light-blocking means blocks the light beam so as to prevent the latter from passing beyond the projector. A positioning structure is operatively connected to the light-blocking means and responds exclusively to movement of a slide to and from the projecting position for positioning the light-blocking means in its non-blocking and blocking positions, respectively, so that if the slide-shifting structure is actuated without a slide, the light-blocking means will remain in its blocking position. This positioning structure normally positions the light-blocking means in its blocking position and is situated in part in the path of movement of a slide to the projecting position to be engaged and moved by the slide for displacing the light-blocking means from its blocking to its non-blocking position during movement of a slide into and as the latter approaches its projecting position. This positioning structure when it is actually engaged and moved by the slide coacts with the latter for movement with but not with respect thereto, so that there is no relative movement between the positioning structure and the slide during the time when the latter engages and moves the positioning structure. In this way there is no rubbing or other frictional displacement of the slide and positioning structure, one with respect to the other.

---

The present invention relates to slide projectors.

In certain well known types of slide projectors, when one slide is exchanged for another a light-blocking means operates to prevent the light beam from reaching the screen or the like onto which the image of a slide is normally projected, so that in this way the eyes of the audience will not be subjected to undesirably bright light which suddenly is visible and invisible during changing of a slide.

However, it sometimes happens with conventional slide projectors of this type that when the projector is actuated to change a slide, but there is no slide available to be moved into the projecting position, the light-blocking structure will nevertheless be automatically moved from its blocking position, so that under these circumstances the eyes of the audience are undesirably subjected to the glare of the light beam of the projector.

It is accordingly a primary object of the present invention to provide for a slide projector of the above type a construction which will reliably prevent any undesirable glare from the light beam of the projector even if it should happen that the operator actuates the slide-changing structure when there is absolutely no slide available to be positioned in the projecting position.

In particular, it is an object of the invention to provide a structure which will respond to the actual presence of a slide in the projecting position for uncovering a light beam of the projector so that it can pass through the slide while participating in the projection of an image thereof onto the screen, wall, or the like.

Furthermore, it is an object of the present invention to provide a structure which will accomplish the above objects while at the same time being exceedingly simple, compact, and inexpensive.

In addition, it is an object of the invention to provide a structure which can accomplish the above objects while modifying a conventional projector only to a limited degree.

Primarily the structure of the invention includes a positioning means operatively connected to a light-blocking means for positioning the latter in a light-blocking position or in a non-blocking position, and this positioning means of the invention responds only to movement of a slide to a projecting position for displacing the light-blocking means from its blocking to its non-blocking position. As a result, if it should happen that the slide-shifting mechanism of the slide projector is actuated without a slide, the positioning means of the invention will not respond and will thus serve to maintain the light-blocking means in its light-blocking position, so that with this construction an observer of the screen, wall or the like onto which the image of the slide is normally projected will not be subjected to undesirable glare.

Furthermore, the positioning means of the invention is directly engaged and moved by the slide but coacts with the slide, when engaged and moved thereby, to move together with but not with respect to the slide, so as to avoid any frictional rubbing between the slide and the positioning means.

The invention is illustrated by way of example in the accompanying drawings which form part of the application and in which.

Figure 1:
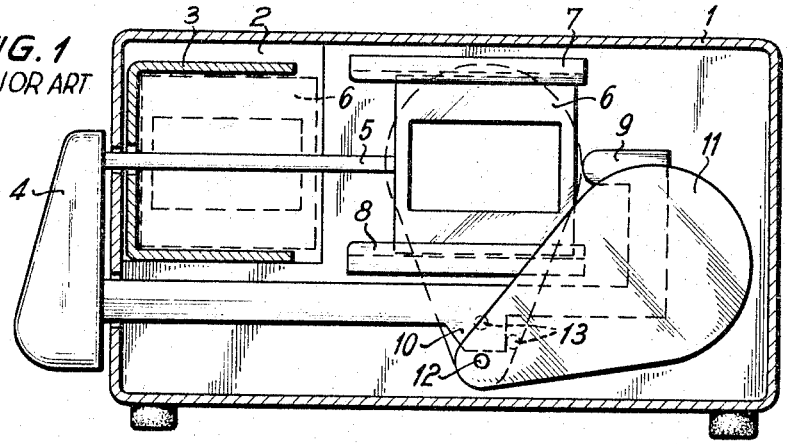
FIG. 1 is a partly diagrammatic transverse section of a conventional slide projector showing how the light beam is conventionally blocked.

The prior art projector 1, part of which is illustrated in FIG. 1, has a conventional guide 2 for a magazine 3 which contains a row of slides 6 which are projected in succession. The magazine 3 is guided by the guide 2 for movement in a direction perpendicular to the plane of FIG. 1. A slide-changing means or mechanism 4 is provided, and in the illustrated example this slide-shifting means 4 is manually operable and includes a pusher 5 which engages and pushes a slide 6, situated in the path of movement of the pusher 5, from the non-projecting position situated in the magazine 3, as shown in dotted lines in FIG. 1 to the right, as viewed in FIG. 1, to the projecting position illustrated in solid lines in FIG. 1. A guide means is provided to guide the slide 6 for movement to and from its projecting position, and this guide means is diagrammatically shown as including the pair of guide rails 7 and 8 which respectively engage the upper and lower edges of the slide 6.

FIG. 1 illustrates the slide-shifting means 4 in the position it takes when the slide 6 is in the solid-line projecting position thereof. In this position, a light beam derived from a lamp of the projector passes through the slide 6 so as to project, in combination with the objective of the projector, an image in the slide onto a wall, screen, or the like. The slide-shifting means 4 includes, in addition to the pusher 5, a return arm 9 which engages the right edge of the slide 6, as viewed in FIG. 1, to return the latter from the solid-line projecting position to the dotted-line non-projecting position when the slide-shifting means 4 is manually shifted to the left, as viewed in FIG. 1.

The slide-shifting means 4 includes a projection 10 which controls the position of a light-blocking means 11 in the form of an opaque plate supported for turning movement by a stationary pivot 12 and urged by an unillustrated spring to the dotted-line position where the light-blocking means 11 is situated in the path of the light beam to block the latter and thus prevent the light beam from reaching the wall, screen, or the like so as to prevent undesirable glare if there is no slide in the projecting position. The light-blocking means 11 carries a pin 13 situated in the path of movement of the projection 10, so that when the slide-shifting means 4 is displaced to the right, as viewed in FIG. 1, to the illustrated projecting position, the projection 10 will engage the pin 13 to turn the light-blocking means 11 in a clockwise direction, as viewed in FIG. 1, to the illustrated solid-line position where the light-blocking means 11 is in a non-blocking position situated beyond the light beam, thus permitting the image to be projected. When the slide-shifting means 4 is returned to its rest position, the projection 10 will move to the left, as viewed in FIG. 1, and then the un-illustrated spring will return the light-blocking means 11 to its dotted-line blocking position.

It is apparent, therefore, that with the prior art structure of FIG. 1, the light-blocking means 11 will always be situated in its non-blocking position when the slide-shifting means is advanced to the position for shifting a slide into the projecting position shown in solid lines for the slide 6 of FIG. 1. It is to be noted, however, that the light-blocking means 11 will be advanced to the solid-line non-blocking position thereof shown in FIG. 1 even if it should happen that the slide-shifting means 4 is actuated to shift a slide to the projecting position when there actually is no slide present to be engaged by the pusher 5. This can very easily happen when the operator inadvertently continues to actuate the slide-shifting means 4 after the last slide of the magazine has been projected and returned to the magazine. This one, inadvertent actuation of the slide-shifting means will result in the light beam of the projector reaching the screen, wall or the like without any slide situated in its path so that the viewers will be subjected to the undiminished glare of the lamp of the projector.

Figure 2:
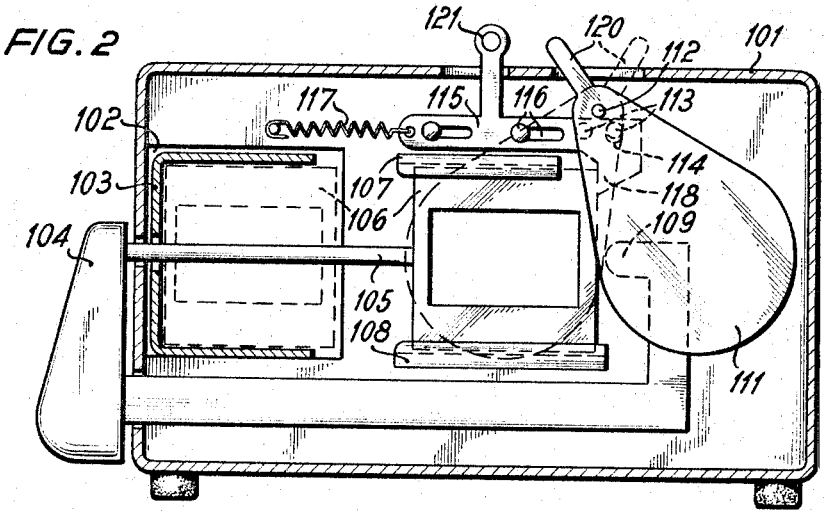
FIG. 2 is a transverse sectional view of a projector similar to that of FIG. 1 but modified to include the structure of the invention.
Figure 3:
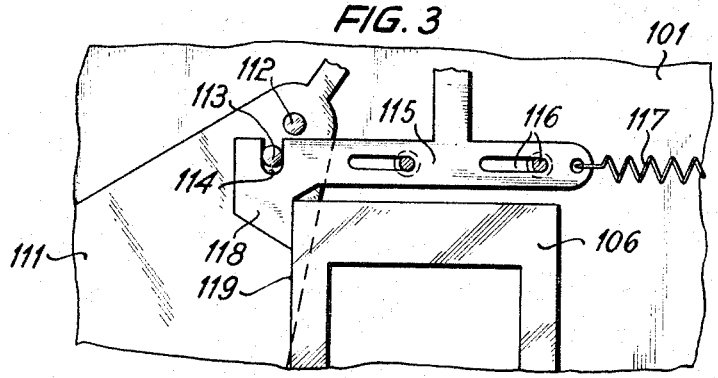
FIG. 3 shows on an enlarged scale, as compared to FIG. 2 the structure of the invention as seen from the rear side thereof which is not visible in FIG. 2.

This highly undesirable disadvantage of the conventional projectors of the type shown in FIG. 1 is eliminated with the structure of the invention, an example of which is shown in FIGS. 2 and 3.

In FIGS. 2 and 3 the projector 101 is also provided with a magazine guide 102 for the magazine 103 which carries a row of slides 106. The slide-shifting means 104 also includes the pusher rod 105 which engages a slide 106 to advance the latter along the guide means formed by the rails 107 and 108 into the projecting position shown in solid lines in FIGS. 2 and 3. The slide 106 is shown in its non-projecting position in the magazine 103 in dotted lines in FIG. 2. The slide 106 is returned to the magazine 103 by a return arm 109 forming part of the manually operable slide-shifting means 104 and acting in the same way as the arm 9 of FIG. 1.

The structure of the invention also includes a light-blocking means 111 formed by an opaque plate situated in a plane which is normal to the optical axis of the projector, and a support means formed by a stationary pivot 112 supports the light-blocking means 111 for turning movement between the solid-line non-blocking position shown in FIG. 2 and the dotted-line light-blocking position also indicated in FIG. 2. This light-blocking means 111 of the present invention also carries a pin 113, but with the structure of the invention this pin 113 is situated in an elongated notch 114 which is formed in an elongated motion-transmitting member 115 guided for longitudinal movement by a pin-and-slot means 116. This pin-and-slot means 116 includes a pair of pins extending respectively through a pair of longitudinal slots of the motion transmitting member 115 so as to guide the latter for longitudinal movement through a distance determined by engagement of the ends of the slots with the pins. This motion transmission member 115 forms, together with a spring 117, the positioning means of the invention, and the positioning means of the invention normally locates the light-blocking means 111 in its light-blocking position shown in dotted lines in FIG. 2. Thus, when there is no slide 106 in the projecting position shown in solid lines in FIG. 2, the spring 117 of the positioning means of the invention acts on the motion transmitting member 115 of this positioning means to displace the latter to a position where the notch 114 cooperates with the pin 113 to situate the light-blocking means 111 in its light-blocking position. Thus, when there is no slide 106 in the projecting position, the spring 117 will act through the motion transmitting member 115 on the light-blocking means 111 to swing the latter in a clockwise direction, as viewed in FIG. 2, into the dotted line position shown in FIG. 2. At this time, the right ends of the slots of the pin-and-slot means 116 will engage the pins thereof, as viewed in FIG. 2, so as to determine the location of the opaque plate 111 in its dotted line position shown in FIG. 2.

The motion-transmitting member 115 is provided with a downwardly directed projection 118 situated in the path of movement of a leading side edge 119 of the slide 106 during movement of the latter to its projecting position. Therefore, the positioning means 115, 117 of the present invention responds only to movement of a slide into the projecting position to displace the light-blocking means 111 from its blocking to its non-blocking position. Just before the slide 106 reaches its projecting position, the leading edge 119 thereof (FIG. 3) engages the projection 118 of the motion transmitting member 115 and advances the latter in opposition to the spring 117 to the position where the light-blocking means 111 is situated in its non-blocking position beyond the light beam of the projector. Because the pin-and-slot guiding structure 116 guides the motion transmitting member 115 for movement in a direction which is precisely parallel to the direction of movement of the slide 106, there is no relative movement between the slide 106 and the projection 118 when the latter is engaged and moved by the slide 106, so that in this way with the positioning means of the invention there is no frictional rubbing between the slide 106 and the positioning means. The gliding friction of the slide-shifting means 104 is strong enough to hold the latter in the position illustrated in FIG. 2 in opposition to the spring 117, so that when the slide-shifting means 104 is returned to its rest position, the initial movement thereof will be augmented by the force of the spring 117 which will cause the projection 118 to follow the slide 116 during the initial part of its return movement by the return arm 109. This continues until the right ends of the slots of the pin-and-slot means 116, as viewed in FIG. 2, engages the pins thereof, and then the slide 106 continues to return to its dotted-line position shown in FIG. 2 exclusively by the action of the return arm 109.

Therefore, it will be seen that with the structure of the invention, the light-blocking means 111 is not actuated by the slide-shifting means 104 directly. The blocking means 111 is actuated only in response to movement of a slide by the slide-shifting means, so that if the slide-shifting means 104 is indeed brought into the projecting position when there actually is no slide present to be moved to the projecting position, the light-blocking means 111 will remain in the dotted line position shown in FIG. 2 continuing to block the light beam of the projector, because the spring 117 will maintain the motion transmitting member 115 in its rest position inasmuch as no slide has engaged the projection 118 of the motion transmitting member. Therefore, there will be no glare on the screen or the like if the slide-shifting means 104 is actuated after the last slide of a magazine has been displaced back from the projecting position into the magazine.

In order, however, to enable the operator to adjust the lamp of the projector as well as the direction of the light beam thereof, it is desirable to permit, at least during the initial set up of the projector, the light beam thereof to reach the screen or the like even if there is no slide to be projected, and for this purpose the structure of the invention includes a manually operable means operatively connected either to the light-blocking means 111 or to the motion transmissing member 115 of the positioning means, or to both, so that in this way the operator can manually control the position of the light-blocking means 111. For this purpose the light-blocking means 111 carries a projecting portion 120 extending through a slot in the housing of the projector 101 to the exterior thereof so as to be accessible to the operator who, by turning the projection 120, can manually control the position of the light-blocking means 111, as is apparent from FIG. 2. However, the motion transmitting member 115 of the positioning means is also provided with a projection 121 extending through a slot of the housing of the slide projector to the exterior thereof so as to be accessible to the operator who can move the projection 121 to the right or left, as viewed in FIG. 2, for controlling the position of the light-blocking means 111. In this way it is possible for the operator, whenever desired, to direct the light beam onto the screen or the like.

The invention of course is not limited to the specific details described above and shown in the drawings. For example, instead of a spring 117 it is possible to provide a suitable weight or the like to urge the light-blocking means into the normal rest position where it blocks the light beam. Moreover, the light-blocking element 111 can have a projection which is directly engaged by the slide 106 so that the latter acts directly on the light-blocking means. Moreover, the light-blocking means can have a structure different from that shown and can be guided for movement in different directions. For example, light-blocking means can be guided for linear shifting movement back and forth between its blocking and non-blocking positions.

The invention is also of complete utility with that type of projector where instead of manually changing the positions of the slides, the slides are shifted by power-operated structure. Moreover, the slide-shifting means need not be linearly movable back and forth, and the slides themselves need not be supplied by way of a magazine, but instead the projector can simply receive a stack of slides on which the structure operates to successively project images thereof.

What is claimed is:

1. In a slide projector, slide-shifting means for shifting a slide to and from a projecting position where a light beam passes through the slide, light-blocking means, support means supporting said light-blocking means for movement between a non-blocking position where said light-blocking means does not block the light beam and a blocking position where said light-blocking means blocks the light beam to prevent the latter from passing beyond the projector, and positioning means operatively connected to said light-blocking means and responding only to movement of a slide to and from said projecting position for positioning said light-blocking means in said non-blocking and blocking positions thereof, respectively, so that if said slide-shifting means is actuated without a slide said light-blocking means will remain in said blocking position thereof, said positioning means normally positioning said light-blocking means in said blocking position thereof and being situated in the path of movement of a slide to said projecting position to be engaged and moved by said slide for displacing said light-blocking means from said blocking to said non-blocking position thereof during movement of a slide into said projecting position thereof, and said positioning means coacting with said slide, during engagement therewith and movement thereby, for moving with but not with respect to said slide to eliminate relative movement between said positioning means and slide when the latter engages and moves said positioning means and thus prevent rubbing of said slide during engagement thereof with said positioning means.

2. In a slide projector as recited in claim 1, said positioning means including a spring urging said light-blocking means to said blocking position thereof.

3. In a slide projector as recited in claim 1, said positioning means including a motion-transmitting member situated in the path of movement of a slide to said projecting position thereof and operatively connected to said light-blocking means for moving the latter from said blocking to said non-blocking position when said motion-transmitting member is moved by a slide during movement of the latter into said projecting position thereof.

4. In a projector as recited in claim 3, guide means guiding a slide for movement to and from said projecting position thereof and engaging the slide when it is in said projecting position, said motion-transmitting member being situated adjacent said guide means and having a projection situated in the path of movement of a slide to be engaged and moved thereby.

5. In a projector as recited in claim 4, said positioning means including a spring operatively connected to said motion-transmitting member for urging the latter to a position maintaining said light-blocking means normally in said blocking position thereof.

6. In a projector as recited in claim 4, said motion-transmitting member being situated over and extending longitudinally along the slide when the latter is in the region of its projecting position and said projection of said motion-transmitting member extending downwardly into the path of movement of a leading edge of the slide as the latter approaches and is situated in the region of its projecting position, said positioning means including a pin-and-slot structure coacting with said motion-transmitting member to guide the latter for movement parallel to the direction of movement of the slide so that when the latter engages and moves said motion-transmitting member, said motion-transmitting member moves with but not with respect to the slide to prevent rubbing between the motion-transmitting member and the slide.

7. In a slide projector having a slide-shifting mechanism for shifting a slide to and from a projecting position where a light beam passes through the slide, light-blocking means supported for movement between a light-blocking position blocking said light beam and a non-blocking position out of the path of said light beam, positioning means operatively connected to said light-blocking means for positioning the latter in one or the other of said positions thereof, said positioning means responding only to movement of a slide to and from said projecting position thereof for respectively positioning said light-blocking means in said non-blocking and blocking positions thereof, so that if the slide shifting mechanism is actuated without a slide said light-blocking means will remain in said blocking position thereof, and said positioning means being directly engaged and moved by a slide when the latter is in the region of said projecting position and coacting with said slide, during engagement therewith and movement thereby, for moving with but not with respect to the slide to prevent rubbing between the slide and positioning means, and manually operable means operatively connected to one of said means for manually displacing said light-blocking means between said positions thereof.

8. In a slide projector, slide-shifting means for shifting a slide to and from a projecting position where a light beam passes through the slide, light-blocking means pivotally mounted for turning movement between a light-blocking position blocking said light beam and a non-blocking position out of the path of said light beam, an elongated motion transmitting member and pin-and-slot means guiding the latter for longitudinal movement in the direction of movement of the slide by said slide shifting means, said motion transmitting member being operatively connected to said light-blocking means for displacing the latter between said positions thereof and having a projecting portion situated in the path of movement of a slide to said projecting position thereof so that said motion transmitting member moves in response to movement of a slide to said projecting position for displacing said light-blocking means to said non-blocking position thereof, and said pin-and-slot means guiding said motion-transmitting member for movement with but not with respect to the slide when the latter engages and moves the motion-transmitting member so as to prevent rubbing between the motion-transmitting member and the slide, and a spring operatively connected to said motion transmitting member for urging the latter to a rest position situating said light-blocking means in said blocking position thereof.

References Cited

UNITED STATES PATENTS

| | | | |
|---|---|---|---|
| 775,963 | 11/1904 | Bentzon | 88—28 |
| 2,724,989 | 11/1955 | Badalich | 88—28 |
| 2,960,004 | 11/1960 | Jungjohann | 88—28 |
| 3,094,038 | 6/1963 | Briskin et al. | 88—28 |
| 3,173,331 | 3/1965 | Danner | 88—28 |
| 3,228,132 | 1/1966 | Wiklund | 40—79 |

NORTON ANSHER, *Primary Examiner.*

R. M. SHEER, *Assistant Examiner.*